United States Patent
Lee et al.

(10) Patent No.: US 9,397,734 B2
(45) Date of Patent: Jul. 19, 2016

(54) METHOD FOR DIFFERENTIALLY QUANTIZING CHANNEL INFORMATION IN MULTI-ANTENNA WIRELESS SYSTEMS AND SYSTEM ADOPTING THE SAME

(75) Inventors: Yong Hwan Lee, Seoul (KR); Hee-Nam Cho, Seoul (KR); Jin-Woo Lee, Suwon / Gyeonggi-do (KR)

(73) Assignee: SNU R&DB FOUNDATION, Seoul (KR)

( * ) Notice: Subject to any disclaimer, the term of this patent is extended or adjusted under 35 U.S.C. 154(b) by 603 days.

(21) Appl. No.: 13/639,845

(22) PCT Filed: Apr. 6, 2011

(86) PCT No.: PCT/KR2011/002410
§ 371 (c)(1),
(2), (4) Date: Dec. 17, 2012

(87) PCT Pub. No.: WO2011/126299
PCT Pub. Date: Oct. 13, 2011

(65) Prior Publication Data
US 2013/0083685 A1    Apr. 4, 2013

(30) Foreign Application Priority Data

Apr. 6, 2010 (KR) .................. 10-2010-0031575

(51) Int. Cl.
*H04B 7/04* (2006.01)
*H04W 24/10* (2009.01)
*H04B 7/06* (2006.01)

(52) U.S. Cl.
CPC ............ *H04B 7/0417* (2013.01); *H04B 7/0434* (2013.01); *H04B 7/0478* (2013.01);
(Continued)

(58) Field of Classification Search
CPC ... H04B 7/0617; H04B 7/0641; H04B 7/0417
USPC .................................................. 370/312, 252
See application file for complete search history.

(56) References Cited

U.S. PATENT DOCUMENTS 7,321,563 B2    1/2008 Kim et al.
8,446,971 B2 *  5/2013 Li et al. ................... 375/260
(Continued)

FOREIGN PATENT DOCUMENTS

KR    10-2009-0041441 A    4/2009
KR    10-2009-0115829 A    11/2009

OTHER PUBLICATIONS

Raghavan et al ' Systematic Codebook Designs for Quantized Beamforming in Correlated MIMO Channels 'IEEE Journal on Selected Areas in Communications, vol. 25, No. 7, Sep. 2007.*

(Continued)

*Primary Examiner* — Donald Mills
*Assistant Examiner* — Henry Baron

(57) ABSTRACT

A method of signal transmission based on differentially quantized channel information in a multi-antenna wireless communication system which can transmit signal to multiple mobile stations simultaneously through multiple transmit antennas includes a main codebook reporting step of each mobile station for quantizing channel correlation information (CCI) using a main-codebook and reporting an index of the main codebook, which corresponds to the quantized CCI, to a base station. A sub-codebook reporting step of each mobile station for quantizing the change of the CCI between the quantization interval using a sub-codebook and reporting an index of the sub-codebook, which corresponds to the quantized CCI change, to a base station. A multi-user eigen-beam transmission step of the base station for generating multiple eigen-beams using the index of the main-codebook or sub-codebook reported from mobile stations and transmitting them to multiple users simultaneously.

13 Claims, 7 Drawing Sheets

(52) U.S. Cl.
CPC ............ *H04B 7/0617* (2013.01); *H04B 7/0639* (2013.01); *H04B 7/0641* (2013.01); *H04B 7/0647* (2013.01); *H04W 24/10* (2013.01); *H04B 7/0452* (2013.01)

(56) References Cited

U.S. PATENT DOCUMENTS

2008/0049709 A1  2/2008  Pan et al.
2011/0058506 A1  3/2011  Lee et al.

OTHER PUBLICATIONS

International Search Report for PCT/KR2011/002410 filed on Apr. 6, 2011.

* cited by examiner

US 9,397,734 B2

METHOD FOR DIFFERENTIALLY QUANTIZING CHANNEL INFORMATION IN MULTI-ANTENNA WIRELESS SYSTEMS AND SYSTEM ADOPTING THE SAME

TECHNICAL FIELD

The present invention relates, in general, to a method of quantizing channel state information (CSI) in a multi-antenna wireless system and a wireless system using the method and, more particularly, to a method that differentially quantizes the CSI so as to reduce the amount of information required to quantize the CSI in a multi-antenna system.

BACKGROUND ART

Multi-antenna technology has attracted attention as one of transmission schemes that can innovatively improve the channel capacity of a wireless communication system. If a base station is aware of instantaneous CSI of a mobile station, Singular Value Decomposition (SVD)-based techniques or single beamforming-based techniques can be used in a single user environment, and Dirty Paper Coding (DPC)-based techniques or multi-beamforming-based techniques can be used in a multi-user environment, which can provide improved system capacity.

Generally, in order to employ such a multi-antenna technology, a mobile station estimates the CSI using a pilot signal received together with data signal, transmitted from the base station, quantizes the CSI into a fixed bit size format, and reports the quantized CSI to the base station through an uplink channel.

In order to reduce the total amount of CSI information to be reported, a number of techniques for quantizing instantaneous CSI have been proposed. However, previous CSI quantization techniques still suffer from large signaling burden associated with frequent transmission of instantaneous CSI at each frame.

In order to alleviate such a problem, single- or multi-eigen-beamforming techniques have been proposed, which can improve the system capacity by generating transmit beams using channel correlation information which may represent the average (or statistical) CSI of a mobile station. Since the channel correlation is very slowly time-varying, such techniques are advantageous in that the mobile stations can report their channel correlation information to the base station at relatively long period, thus significantly reducing the CSI signaling burden.

However, previous studies show that the use of channel correlation information quantized into a small bit size may significantly limit the performance of multi-antenna technique. It is preferable to employ a quantization technique that can reduce the total amount of quantized channel information compared to existing schemes without degrading the system capacity, or can improve the performance by using the same amount of quantized channel information.

DISCLOSURE

Technical Problem

Accordingly, the present invention has been made keeping in mind the above problems occurring in the prior art, and a principal object of the present invention is to provide a method of quantizing the CSI and an apparatus using the method, which can reduce the signaling burden for the reporting of CSI in a wireless communication system that employs multi-antenna technology.

In particular, the present invention is intended to provide a method of quantizing CSI and an apparatus using the method, which can reduce the quantization bit size compared to the conventional technology without degrading the system capacity or, alternatively, can improve the transmit performance by using the same quantization bit size.

Technical Solution

In order to accomplish the above object, the present invention provides a method of differentially quantizing the CSI in a multi-antenna wireless system which transmits signal to multiple mobile stations using multiple transmit antennas, including a main codebook feedback step of quantizing an entire range of channel correlation information of each mobile station to generate a main codebook, feeding back an index of a representative value of the main codebook to a base station, forming multiple eigen-beams using the index of the representative value of the main codebook, and transmitting a data signal, and a sub-codebook feedback step of differentially quantizing only a partial range of the channel correlation information based on variations in the channel correlation information to generate a sub-codebook, feeding back an index of a representative value of the sub-codebook to the base station, forming multiple eigen-beams using the index of the representative value of the sub-codebook, and transmitting a data signal.

Preferably, the method may further include the step of storing channel correlation information, an entire range of which is quantized, or channel correlation information, a partial range of which is quantized, and the sub-codebook feedback step may be configured to compare channel correlation information quantized during a previous period with currently quantized channel correlation information, thus calculating the variations in the channel correlation information.

In this case, the sub-codebook feedback step may be configured such that the sub-codebook is generated in consideration of a maximum channel variation, the maximum channel variation being calculated by the following Equation 10:

$$\Delta\rho_{l,max} = \rho_{l,max}(t) - \rho_l(t-\Delta t) \qquad \text{[Equation 10]}$$

where $\Delta\rho_{l,max}$ denotes a maximum range in which the channel correlation information can be varied, $\rho_l(t-\Delta t)$ denotes a channel correlation coefficient in previous information feedback time, and $\rho_{l,max}(t)$ is calculated by the following Equation 9:

$$\rho_{l,max}(t) = J_0(2\pi d/\lambda) + 2\sum_{i=1}^{\infty} J_{2i}(2\pi d/\lambda)\cos(2i(AoD_k(t- \qquad \text{[Equation 9]}$$
$$\Delta t) + \Delta_{AoD_l}))\mathrm{sinc}(2iAS) + j\left(2\sum_{i=0}^{\infty} J_{2i+1}(2\pi d/\lambda)\sin((2i+1)(AoD_k(t-\Delta t) + \Delta_{AoD_l}))\mathrm{sinc}((2i+1)AS)\right)$$

where $\lambda$, d, D, and AS respectively denote a wavelength of a signal, an interval between antennas of the base station, a distance to the base station, and angle spread, $AoD_l$ denotes a departure angle of a mobile station l, $\Delta_{AoD_l} = v_l\Delta t/D$ denotes a variation in the departure angle of the mobile station depending on velocity of the mobile station, and $J_z(x)$ denotes a z-th order Bessel function of a first kind.

Further, the sub-codebook may be generated in a fixed bit type in which a size of the sub-codebook is maintained at a uniform level and precision of quantization is adjusted depending on a maximum variation in the channel correlation information, or in an adaptive bit type in which precision of quantization is maintained at a uniform level and a size of the sub-codebook is adjusted depending on variations in the channel correlation information.

Preferably, after the main codebook feedback step, the sub-codebook feedback step may be repeatedly performed.

Furthermore, the main codebook feedback step may be performed either at regular preset periods or when a transmission error is detected in an uplink.

Further, the present invention provides a multi-antenna wireless system using a method of differentially quantizing CSI, the multi-antenna wireless system having channel correlation, including a mobile station including a channel correlation information estimator for estimating channel correlation information;

a channel correlation information quantizer for quantizing an entire range of the channel correlation information and obtaining a main codebook and an index of a representative value of the main codebook; a channel correlation information variation calculator for calculating variations in the channel correlation information; and a channel correlation information variation quantizer for quantizing a partial range of the channel correlation information and obtaining a sub-codebook and an index of a representative value of the sub-codebook, wherein the mobile station feeds back the index of the representative value of the main codebook or the index of the representative value of the sub-codebook to a base station.

Further, the multi-antenna wireless system may further include a base station including a channel correlation information calculator for calculating the channel correlation information based on the index of the representative value fed back from the mobile station; and a multiple eigen-beamformer for forming multiple eigen-beams.

Preferably, the mobile station and the base station may respectively include channel correlation information storage units for storing quantized channel correlation information.

More preferably, the base station may further include an uplink signal quality measuring unit for measuring signal quality of an uplink reception signal; and a feedback channel Cyclic Redundancy Check (CRC) checker for checking a CRC bit of an uplink channel and then determining whether a transmission error has occurred, and the mobile station may further include a main codebook feedback period decider for deciding on a feedback period of the main codebook based on the signal quality measured by the uplink signal quality measuring unit of the base station or based on occurrence or non-occurrence of an error determined by the feedback channel CRC checker.

Advantageous Effects

In accordance with the present invention, there can be provided a method of quantizing the CSI, which can reduce the amount of information to be reported to the base station through an uplink by reducing the quantization bit size without degrading the system capacity, or can improve system performance by using the same quantization bit size, in a wireless communication system that employs multi-antenna technology.

In particular, the CSI is differentially quantized in consideration of only a partial range in which CSI can vary, upon quantizing the channel correlation information on the basis of the characteristics of the channel correlation information that is relatively slowly varying, thus reducing the burden of the amount of signal information to be fed back to an uplink.

BEST MODE

The present invention relates to a method and apparatus that reduce the amount of quantized CSI using a differential quantization technique in a multi-antenna wireless system, and the present invention will be described with reference to embodiments of the present invention.

In a multi-antenna wireless system according to the present invention, a method of differentially quantizing CSI and a wireless system using the method are configured to differentially quantize and feed back CSI in consideration of only a partial range in which channel correlation information can be varied, on the basis of the characteristics of the channel correlation information that is relatively slowly varying, so that the burden of the feedback of the channel correlation information is greatly decreased, thus improving system capacity.

Figure 4:
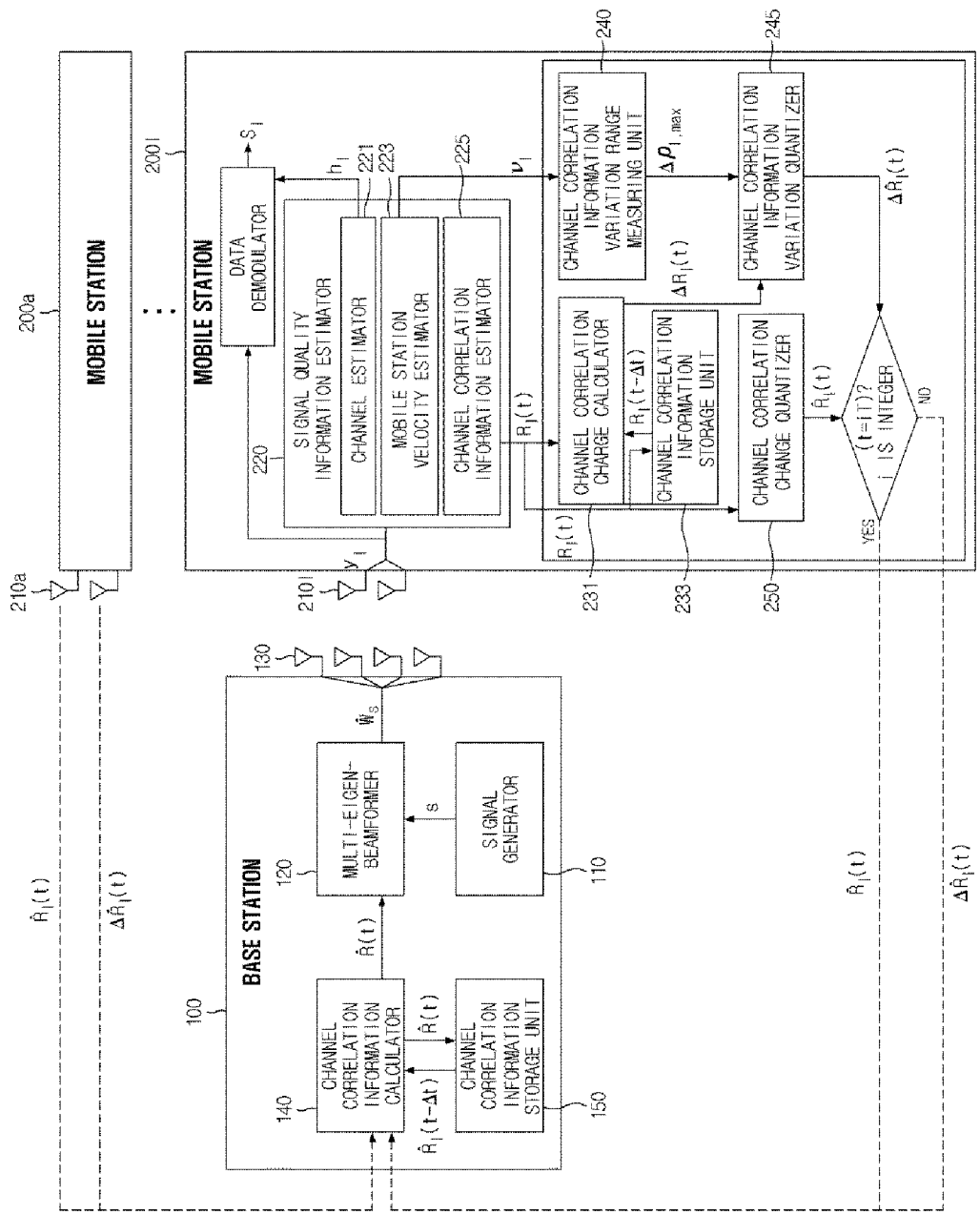
FIG. 4 is a configuration diagram showing an embodiment of a wireless system using a method of quantizing channel correlation information according to the present invention.

FIG. 4 is a configuration diagram showing an embodiment of a method of quantizing channel correlation information and a wireless system using the method according to the present invention.

In the present invention, when channel correlation information is quantized, first quantization and feedback are performed to use a main codebook generated by quantizing the entire range in which channel correlation information can be represented, and to feed back the index of a representative value of the main codebook, and quantization and feedback from a subsequent period are performed to feed back the index of a representative value of variations in the channel correlation information.

For this function, during a first period, each of single or multiple mobile stations 200a to 200l extracts a pilot signal from reception signals transmitted from a base station 100, and each channel correlation information estimator 225 obtain its own channel correlation information. Further, a channel correlation change quantizer 250 quantizes the entire range of channel correlation information and feeds back the quantized channel correlation information to the base station.

The multiple eigen-beamformer 120 of the base station forms multiple eigen-beams of channel correlation information for the mobile stations using the feedback information, and transmits mobile station signals through a signal generator 110. Each mobile station and the base station store the quantized channel correlation information in channel correlation information storage units 150 and 233, respectively.

Then, from a subsequent period, a channel correlation information variation calculator 231 calculates variations in channel correlation information, and a channel correlation information variation quantizer 245 feeds back the index of a representative value of the variations in the channel correlation information using a sub-codebook.

Thereafter, the channel correlation information calculator 140 of the base station updates current channel correlation information using the feedback variation information of the channel correlation information and the channel correlation information stored during a previous feedback period.

MODE FOR INVENTION

Hereinafter, in order to describe the present invention, operational advantages of the present invention and objects achieved by the implementation of the present invention, preferred embodiments of the present invention will be illustrated, and the present invention will be described with reference to the embodiments.

First, the terms used in the present application are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

In the following description of the present invention, redundant descriptions and detailed descriptions of known components or functions that may unnecessarily make the gist of the present invention obscure will be omitted.

Figure 1:
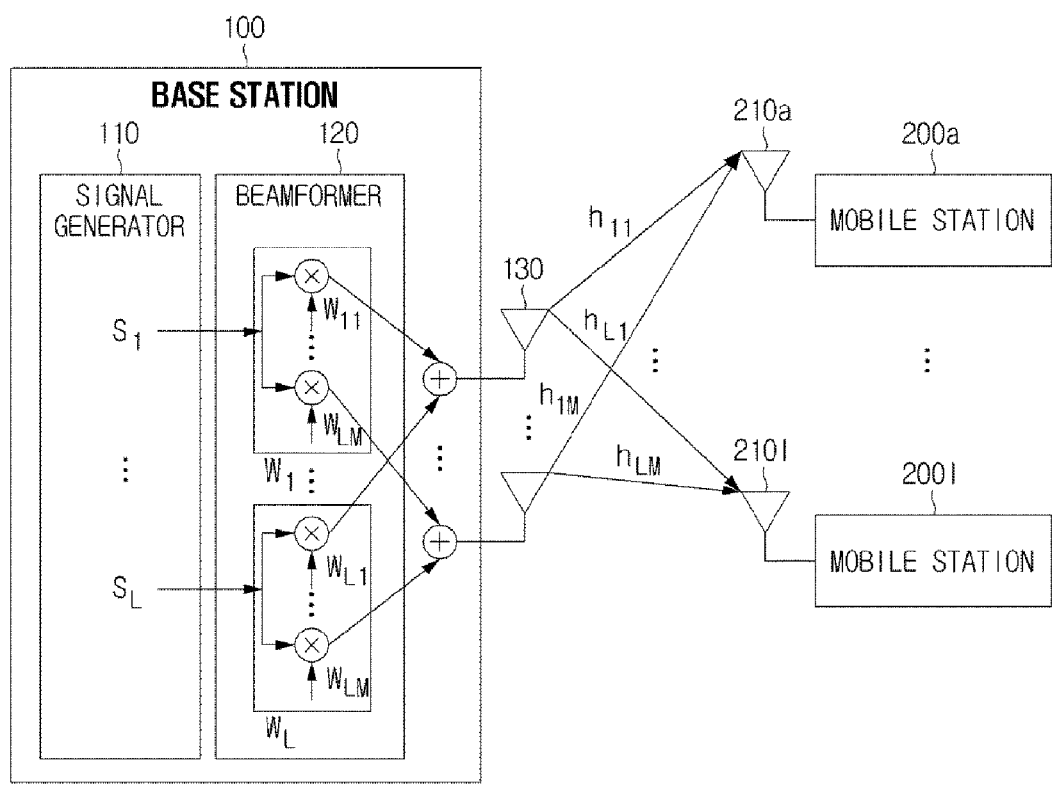
FIG. 1 is a configuration diagram showing a beamforming-based multi-antenna system.

FIG. 1 is a schematic configuration diagram showing a multi-antenna system to which the present invention is applied.

We consider a multi-user wireless communication system, in which a base station having M transmit antennas 130 simultaneously transmits signal to L ($1 \leq L \leq M$) mobile stations 200a to 200l by means of multi-user beamforming.

The beamformer 120 of the base station 100 generates signal by multiplying the beamforming weight w ($=[w_1 \ldots w_L]$) by signal s ($=[s_1 \ldots s_L]^T$) generated by signal generator 110, where $w_l(=[w_{l1} \ldots w_{lM}]^T)$ denotes a normalized beamforming vector for the signal of mobile station l ($1 \leq l \leq L$), and $A^T$ denotes the transpose of matrix A. Letting $h_l$ ($h_l=[h_{l1} \ldots h_{lM}]$) be the channel vector between the base station 100 and mobile station l, the signal received by mobile station l through the receiving antenna can be represented by the following Equation 1:

$$y_l = h_l W s + n_l \qquad \text{[Equation 1]}$$

where $n_l$ denotes a zero-mean complex Gaussian noise with variance $N_0$. Letting $R_l$ be the channel correlation matrix from the base station to mobile station l, the channel vector $h_l$ can be represented by the following Equation 2:

$$h_l = \tilde{h}_l R_l^{1/2} \qquad \text{[Equation 2]}$$

where $\tilde{h}_l$ ($=[\tilde{h}_{l1} \ldots \tilde{h}_{lM}]$) denotes a spatially uncorrelated channel vector, which is an independent and identically distributed (i.i.d.) zero-mean complex Gaussian channel vector with unit variance, and the corresponding channel correlation matrix $R_l$ can be represented by the following Equation 3:

$$R_l = \begin{bmatrix} E\{h_{l1} h_{l1}^*\} & \ldots & E\{h_{l1} h_{lM}^*\} \\ \vdots & \ddots & \vdots \\ E\{h_{lM} h_{l1}^*\} & \ldots & E\{h_{lM} h_{lM}^*\} \end{bmatrix} \qquad \text{[Equation 3]}$$

$$= \begin{bmatrix} 1 & \ldots & \rho_{l,1M} \\ \vdots & \ddots & \vdots \\ \rho_{l,1M}^* & \ldots & 1 \end{bmatrix}$$

where A* denotes the Hermitian matrix of matrix A, E{A} denotes the expectation of A, and $\rho_{l,m_1 m_2}$ denotes the channel correlation coefficient of mobile station l.

A conventional eigen-beamforming technique can improve the system capacity by simultaneously transmitting multiple eigen-beams generated in the direction of the main eigenvector $u_{l,max}$ of the channel correlation matrix $R_l$ of mobile station l, as represented by the following Equation 4:

$$W = [u_{l,max} \ldots u_{L,max}] \qquad \text{[Equation 4]}$$

where the main eigenvector $u_{l,max}$ is defined by an eigenvector corresponding to the maximum eigenvalue $\lambda_{l,max}$ of $R_l$ (i.e., max $[\lambda_{l,1}, \lambda_{l,2}, \ldots, \lambda_{l,M}]$) of mobile station l, where the eigenvalues of $R_l$ can be obtained by means of Eigenvalue Decomposition (EVD) by the following Equation 5:

$$R_l = U_l \Lambda_l U_l^* \qquad \text{[Equation 5]}$$

$$= [u_{l,1} \ldots u_{l,M}] \begin{bmatrix} \lambda_{l,1} & \ldots & 0 \\ \vdots & \ddots & \vdots \\ 0 & \ldots & \lambda_{l,M} \end{bmatrix} \begin{bmatrix} u_{l,1}^* \\ \vdots \\ u_{l,M}^* \end{bmatrix}$$

This beamforming technique can provide system capacity represented by the following Equation 6:

$$R_{MEB} = \sum_{l=1}^{L} E\left\{ \log_2\left(1 + \frac{|h_l u_{l,max}|^2}{M/\gamma_l + \sum_{n=1, n \neq l}^{L} |h_l u_{n,max}|^2}\right) \right\} \qquad \text{[Equation 6]}$$

where $\gamma_l$ denotes the average Signal-to-Noise Ratio (SNR) of mobile station l. However, this system capacity is available only with the use of exact CSI. The system capacity with the use of quantized CSI can be represented by the following Equation 7:

$$\hat{R}_{MEB} = \sum_{l=1}^{L} E\left\{\log_2\left(1 + \frac{|h_l \hat{u}_{l,max}|^2}{M/\gamma_l + \sum_{n=1,n\neq l}^{L} |h_l \hat{u}_{n,max}|^2}\right)\right\}$$ [Equation 7]

where $\hat{u}_{l,max}$ denotes the main eigenvector of the quantized channel correlation matrix $\hat{R}_l$ of mobile station l.

Figure 2:
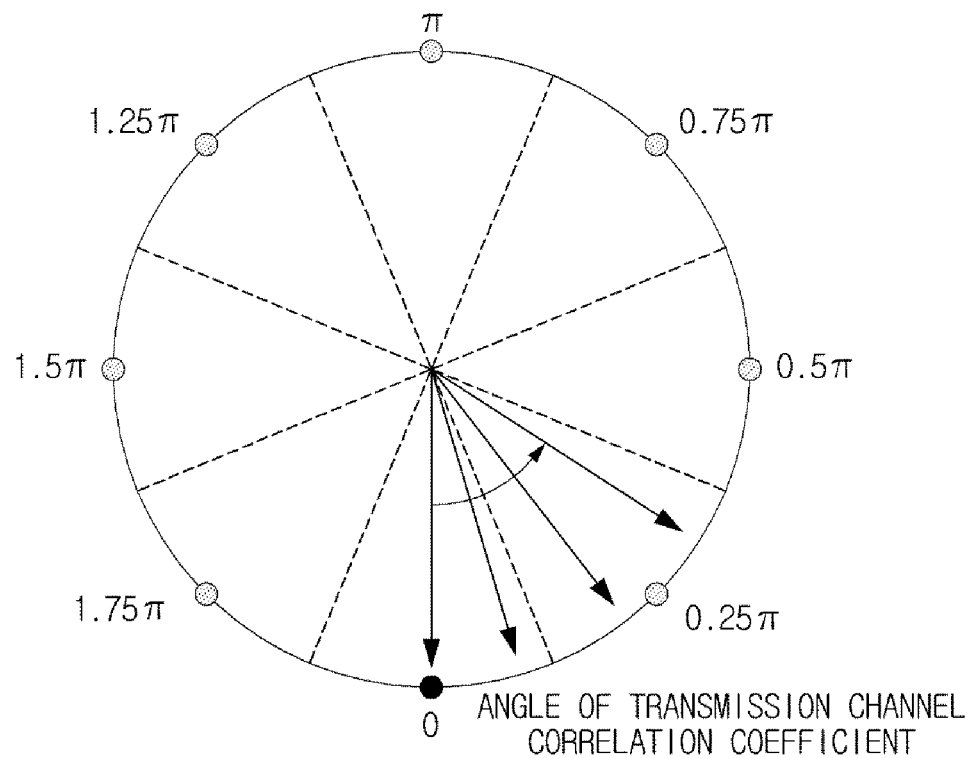
FIG. 2 is a conceptual diagram showing a conventional technique for quantizing channel correlation information.

FIG. 2 illustrates, as an example, conventional quantization of the phase of channel correlation coefficient into a 3-bit quantized format, where the entire range of the phase is considered for the quantization. The following Table 1 illustrates an example of a 3-bit codebook that quantized the phase of channel correlation using a 3-bit code word in consideration of the entire range of the phase (i.e., $[0,2\pi]$). The mobile station reports the index of the corresponding code word to the base station.

TABLE 1

| Index | $\theta_l$ |
|---|---|
| 0 | 0 |
| 1 | $0.25\pi$ |
| 2 | $0.5\pi$ |
| 3 | $0.75\pi$ |
| 4 | $\pi$ |
| 5 | $1.25\pi$ |
| 6 | $1.5\pi$ |
| 7 | $1.75\pi$ |

The channel correlation is relatively slowly time-varying in practical environments, and associated with the velocity of the mobile station and/or the CSI reporting period. However, most of conventional CSI quantization techniques do not exploit the nature of time-varying channel characteristics, leaving possibility for performance improvement.

Figure 3:
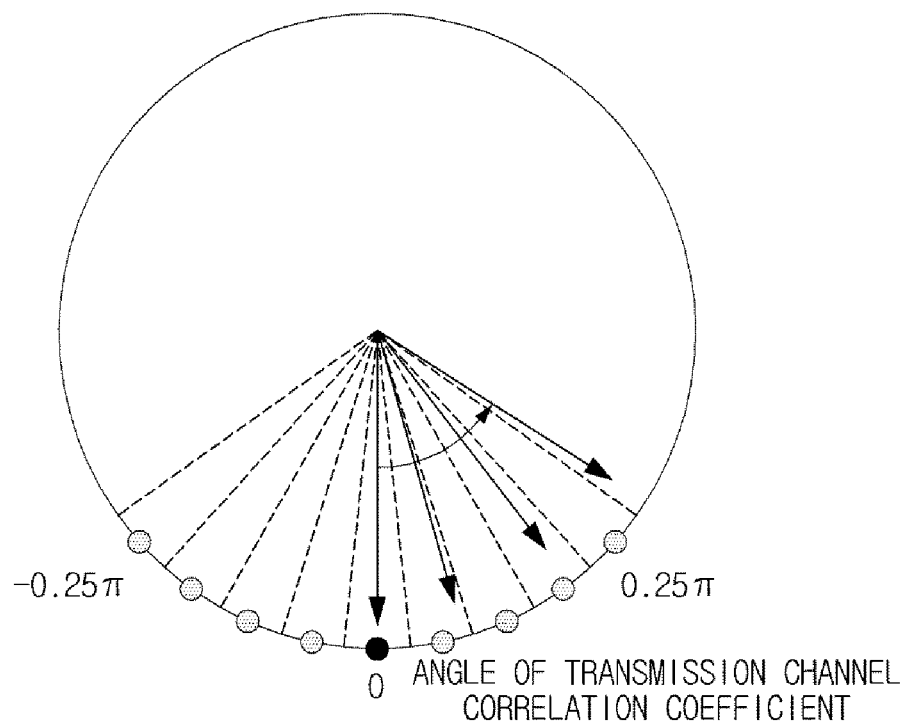
FIG. 3 is a conceptual diagram showing a technique for quantizing channel correlation information according to the present invention.

FIG. 3 illustrates a concept for the quantization of the channel correlation information, which is proposed in the present invention.

The quantization technique according to the present invention fully exploits the nature of slowly time-varying channel characteristics. It quantizes the phase of the channel correlation considering the maximum range in which the phase can vary during the quantization period. The following Table 2 illustrates an example of a 3-bit size sub-codebook for the proposed quantization of the phase of the channel correlation coefficient, where the maximum change of the phase during the quantization period, $\Delta\theta_{l,max}$, is assumed to be $\Delta\theta_{l,max}=0.25\pi$. The mobile station quantizes the phase change of the channel correlation between the current phase and the phase at the previous quantization time using the sub-codebook, and reports the index of the corresponding code word to the base station.

TABLE 2

| Index | $\Delta\theta_l$ |
|---|---|
| 0 | $-0.1875\pi$ |
| 1 | $-0.125\pi$ |
| 2 | $-0.0625\pi$ |
| 3 | 0 |
| 4 | $0.0625\pi$ |
| 5 | $0.125\pi$ |
| 6 | $0.1875\pi$ |
| 7 | $0.25\pi$ |

The present invention will be described in detail with reference to FIG. 4, which shows an embodiment of a method of quantizing CSI and a wireless system using the method.

Each of mobile stations 200a to 200l extracts the pilot signal from the signal received through receiving antennas 210a or 210l, which was transmitted from multiple antennas 130 of base station 100, and estimates the channel correlation information through the channel correlation information estimator 225 using the pilot signal. Then, it quantizes the channel correlation information through a channel correlation change quantizer 250, and reports the quantized CSI to the base station through an uplink channel.

The base station generates multiple eigen-beams using the maximum eigenvector of the quantized channel correlation information reported from the mobile stations through the multi-eigen-beamformer 120, and transmits user signal over the channel through the signal generator 110. Each mobile station receives the signal transmitted from the base station and demodulates it using the channel estimation information estimated by the channel estimator 221.

In the process for the quantization of the channel correlation information, the mobile station performs the first quantization process using a conventional main-codebook that quantizes the channel correlation information in consideration of the entire range of the channel correlation information, as shown in Table 1, and reports the index of a representative value of the main-codebook to the base station.

Each of mobile stations 200a to 200l and the base station 100 store the first quantized channel correlation information in a channel correlation information storage unit 150 and 233, respectively. After the next quantization time, the mobile station calculates the change in the channel correlation during the quantization period through a channel correlation change calculator 231, and generates an index corresponding to the representative value of the change in the channel correlation through a channel correlation change quantizer 250 that utilizes the sub-codebook.

As an example, the following Table 3 shows a fixed 3-bit size sub-codebook designed for four maximum changes in the channel correlation, and the following Table 4 shows an adaptive bit size sub-codebook designed according to the maximum change in the channel correlation, wherein the index of the sub-codebook represents the change in the channel correlation.

TABLE 3

| Index | $\Delta\theta_{l,max} = 0.125\pi$ (B = 3) | $\Delta\theta_{l,max} = 0.25\pi$ (B = 3) | $\Delta\theta_{l,max} = 0.375\pi$ (B = 3) | $\Delta\theta_{l,max} = 0.5\pi$ (B = 3) |
|---|---|---|---|---|
| 0 | $-0.09375\pi$ | $-0.1875\pi$ | $-0.28125\pi$ | $-0.375\pi$ |
| 1 | $-0.0625\pi$ | $-0.125\pi$ | $-0.1875\pi$ | $-0.25\pi$ |
| 2 | $-0.03125\pi$ | $-0.0625\pi$ | $-0.09375\pi$ | $-0.125\pi$ |
| 3 | 0 | 0 | 0 | 0 |
| 4 | $0.03125\pi$ | $0.0625\pi$ | $0.09375\pi$ | $0.125\pi$ |
| 5 | $0.0625\pi$ | $0.125\pi$ | $0.1875\pi$ | $0.25\pi$ |
| 6 | $0.09375\pi$ | $0.1875\pi$ | $0.28125\pi$ | $0.375\pi$ |
| 7 | $0.125\pi$ | $0.25\pi$ | $0.375\pi$ | $0.5\pi$ |

TABLE 4

| Index | $\Delta\theta_{l,max} = 0.125\pi$ (B = 2) | $\Delta\theta_{l,max} = 0.25\pi$ (B = 3) | $\Delta\theta_{l,max} = 0.375\pi$ (B = 3) | $\Delta\theta_{l,max} = 0.5\pi$ (B = 4) |
|---|---|---|---|---|
| 0 | $-0.0625\pi$ | $-0.1875\pi$ | $-0.28125\pi$ | $-0.4375\pi$ |
| 1 | 0 | $-0.125\pi$ | $-0.1875\pi$ | $-0.375\pi$ |

TABLE 4-continued

| Index | $\Delta\theta_{l,max}=$ 0.125π (B = 2) | $\Delta\theta_{l,max}=$ 0.25π (B = 3) | $\Delta\theta_{l,max}=$ 0.375π (B = 3) | $\Delta\theta_{l,max}=$ 0.5π (B = 4) |
|---|---|---|---|---|
| 2 | 0.0625π | −0.0625π | −0.09375π | −0.3125π |
| 3 | 0.125π | 0 | 0 | −0.25π |
| 4 | — | 0.0625π | 0.09375π | −0.1875π |
| 5 | — | 0.125π | 0.1875π | −0.125π |
| 6 | — | 0.1875π | 0.28125π | −0.0625π |
| 7 | — | 0.25π | 0.375π | 0 |
| 8 | — | — | — | 0.0625π |
| 9 | — | — | — | 0.125π |
| 10 | — | — | — | 0.1875π |
| 11 | — | — | — | 0.25π |
| 12 | — | — | — | 0.3125π |
| 13 | — | — | — | 0.375π |
| 14 | — | — | — | 0.4375π |
| 15 | — | — | — | 0.5π |

Thereafter, the base station updates the current channel correlation information through a channel correlation information calculator 140 that exploits the change in the channel correlation reported from the mobile station and the channel correlation information stored at the previous CSI reporting time, as represented by the following Equation 8:

$$\hat{R}(t)=\hat{R}(t-\Delta t)+\Delta\hat{R}(t) \quad \text{[Equation 8]}$$

where $\Delta t$ denotes the CSI reporting period, and $\Delta\hat{R}(t)$ denotes the change in the channel correlation reported from the mobile station. Thus, the amount of signaling burden for reporting the channel correlation information can noticeably be reduced, or the system capacity can be increased with the use of the same signaling burden for reporting the channel correlation information.

Figure 5:
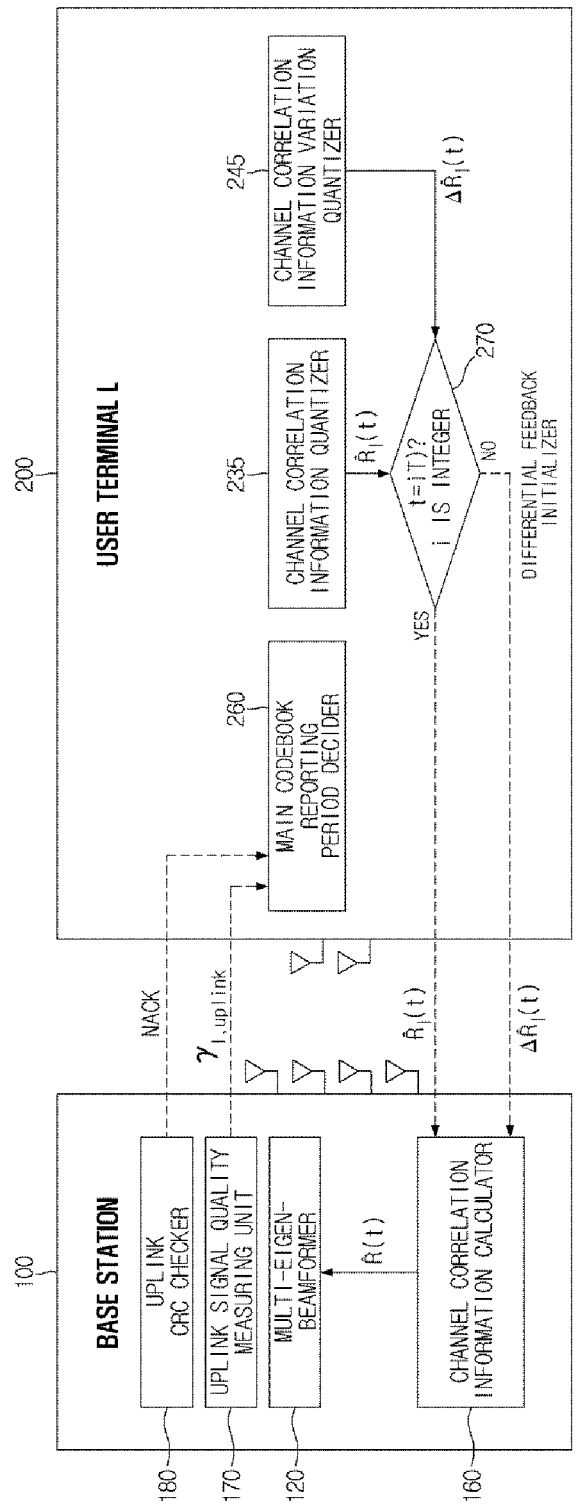
FIG. 5 is a configuration diagram showing an embodiment of a wireless system using a method of reducing the transfer of transmission errors in differentially quantized correlation information according to the present invention.

The quantized channel correlation information reported through an uplink channel may experience channel errors during the transmission as in conventional CSI reporting techniques. In order to alleviate the deterioration of decoding performance of the proposed quantizer due to such transmission errors, the present invention quantizes the channel correlation information using the main codebook either at a regular period of T or when a transmission error occurs, as shown in FIG. 5.

The period T is adjusted according to the uplink channel quality. When the uplink channel quality is good, the probability of transmission error through the uplink is low, and vice versa. It is practical to increase the period T as the uplink channel quality increases, and vice versa. Through an uplink signal quality measuring unit 170, the base station measures the uplink signal quality $\gamma_{l,uplink}$ of mobile station l, and notifies it to mobile station l. Through a main-codebook reporting period decider 260, the mobile station adjusts the period T according to the uplink channel quality notified from the base station, so that the period T is adaptively adjusted in response to the change of the uplink channel quality.

Or, when a transmission error occurs, the channel correlation information calculated by the above Equation 8 is no longer valid after all. In this case, it is practical to reinitiate the proposed quantization process by using the main code-book. Through a uplink CRC checker 180, the base station 100 checks the error correction bits or Cyclic Redundancy Check (CRC) bits of the reported CSI, which indicates whether a transmission error has occurred, and notifies it to the mobile station in a form of Acknowledgement (ACK)/Negative ACK (NACK) message. When the mobile station receives a NACK message, it reports the channel correlation information quantized using the main-codebook at the next reporting time.

The mobile station 200 can estimate the maximum change in the channel correlation information during the reporting period. It first estimates its velocity through a mobile station velocity estimator 223 and accordingly adjusts the quantization bit size associated with the reporting period. It can calculate the maximum change of the channel correlation information, as represented by the following Equation 9:

$$\rho_{l,max}(t) = J_0(2\pi d/\lambda) + 2\sum_{i=1}^{\infty} J_{2i}(2\pi d/\lambda)\cos(2i(AoD_k(t- \quad \text{[Equation 9]}$$

$$\Delta t) + \Delta_{AoD_l}))\text{sinc}(2iAS) + j\left(2\sum_{i=0}^{\infty} J_{2i+1}(2\pi d/\lambda)\sin(2i+$$

$$1)(AoD_k(t-\Delta t) + \Delta_{AoD_l})\right)\text{sinc}((2i+1)AS)\right)$$

where λ denotes the wavelength of the signal, d denotes the distance between the two adjacent antennas of the base station, D denotes the distance between the mobile station and the base station, AS denotes the angle spread, $J_z(x)$ denotes the z-th order Bessel function of the first kind, and $AoD_l$ and $\Delta_{AoD_l}$ ($=v_l\Delta t/D$) denote the departure angle and the variation in the departure angle of mobile station l, respectively. It can calculate the maximum change in the channel correlation coefficient, as represented by the following Equation 10:

$$\Delta\rho_{l,max}=\rho_{l,max}(t)-\rho_l(t-\Delta t) \quad \text{[Equation 10]}$$

where $\Delta t$ denotes the CSI reporting period and $\rho_l(t-\Delta t)$ can be calculated from the channel correlation information $\hat{R}(t-\Delta t)$ of mobile station l at time $t-\Delta t$. The corresponding maximum change in the magnitude and the phase of the channel correlation coefficient can also be obtained by the following Equation 11:

$$\Delta\alpha_{l,max}=\alpha_{l,max}(t)-\alpha_l(t-\Delta t)$$

$$\Delta\theta_{l,max}=\theta_{l,max}(t)-\theta_l(t-\Delta t) \quad \text{[Equation 11]}$$

Each mobile station can generate a sub-codebook in consideration of the maximum change in the channel correlation coefficient obtained by Equation 10, its velocity and the CSI reporting period. The following Table 5 shows an example when the maximum change in the phase of the channel correlation coefficient is assumed to be $\Delta\theta_{l,max}=0.25\pi$.

TABLE 5

| Index | $\Delta\theta_{l,max}$ |
|---|---|
| 0 | 0.125π |
| 1 | 0.25π |
| 2 | 0.375π |
| 3 | 0.5π |

In order to deploy this sub-codebook in practice, the sub-codebook information should be shared with the base station. The base station and the mobile station need to share the same quantization tables (i.e., sub-codebooks) pre-designed in consideration of the maximum change in the channel correlation, as illustrated in Table 5. To support the case when the maximum change in the channel correlation information varies, the base station and the mobile station should change their sub-codebook according to the maximum change in the channel correlation, as shown in the example of the above Table 3 or 4, where Table 3 shows an example of a fixed bit-type sub-codebook and Table 4 shows an example of an adaptive bit-type sub-codebook in which the quantization precision of the sub-codebook is maintained at a uniform level and the bit size of the sub-codebook is adjusted depending on the maximum change in the channel correlation information. The base station can notify its mobile stations the information on the type and mode of sub-codebook usage through a broadcasting message during the network entry process.

Figure 6:
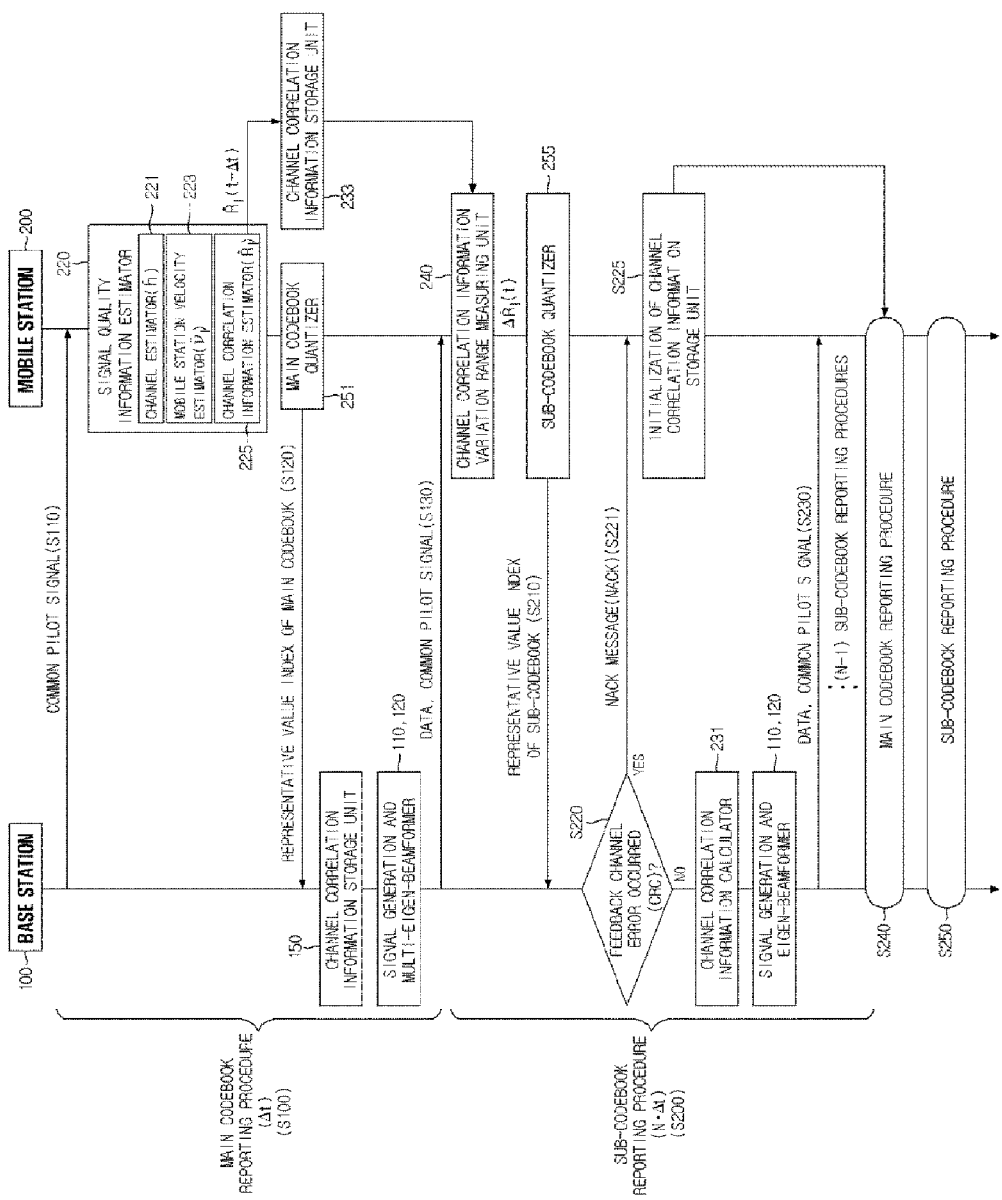
FIG. 6 is a diagram showing the operating process of the wireless system using the method of differentially quantizing channel correlation information according to the present invention.

FIG. 6 illustrates the overall operating procedure between the base station and the mobile station performed to differentially quantize the channel correlation information according to the present invention.

First, the mobile station 200 receives a pilot signal (S110), and the channel correlation information estimator 225 estimates the channel correlation information and stores it in the channel correlation information storage unit 233, and the index of a representative value of the main-codebook, representing the channel correlation information, is reported to the base station through an uplink channel (S120).

The base station 100 stores the index in the channel correlation information storage unit 150, generates multiple eigen-beams using the index, and then transmits data signal to the mobile stations (S130).

From that time, the mobile station 200 measures the range in which the channel correlation information varies, and reports the index of a representative value of a sub-codebook representing the variation range to the base station 100 through the uplink channel (S210).

The base station 100 calculates the channel correlation information using the index, generates multiple eigen-beams, and then transmits data signal to the mobile stations 200 (S230). In this case, the base station 100 can check the error correction bits and/or the CRC bit of the received signal, examine whether an uplink transmission error has occurred (S220), and notify the mobile station 200 whether a uplink transmission error has occurred in a form of ACK/NACK message (S221). If the mobile station 200 receives a NACK message from the base station 100, which indicates the occurrence of transmission error in the uplink channel, so that the mobile station initializes the channel correlation information storage unit (S225), performs the main-codebook feedback procedure (S100), and repeats the sub-codebook feedback procedure (S200) after that.

Figure 7:
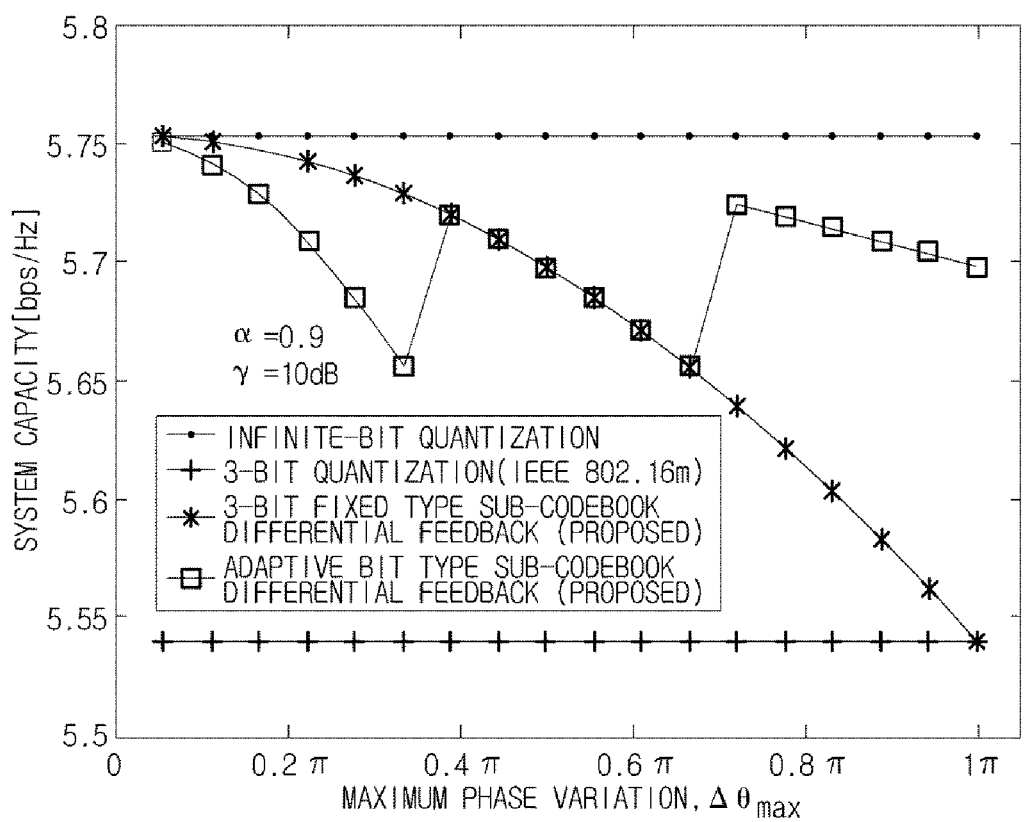
FIG. 7 is a graph showing the results of a performance test on the wireless system using the method of quantizing channel correlation information according to the present invention.

FIG. 7 shows a comparison in performance between the cases where the proposed channel correlation information quantization techniques and the conventional technique considered in IEEE 802.16m standards are individually applied to the multi-eigen-beamforming technique.

It is assumed that the number of transmitting antennas of the base station is M=2 and the number of mobile stations is L=2. Further, for the purpose of simplifying performance evaluation, it is assumed that all the mobile stations have the same average SNR, and the channel correlation information is given by the following Equation 12:

$$R_l = \begin{bmatrix} 1 & \rho_l \\ \rho_l^* & 1 \end{bmatrix}$$ [Equation 12]

where $\rho_l = \alpha_l e^{j2\pi\theta_l}$ denotes the channel correlation coefficient of mobile station l, and $\alpha_l$ and $\theta_l$ denote the magnitude and the phase of the channel correlation coefficient of mobile station l, respectively.

As shown in FIG. 7, when the channel correlation information is quantized into an infinite number of bits, which is impossible in practice, the ideal performance is provided regardless of the maximum variation in channel correlation information. It can be seen that the proposed quantization technique that uses a 3-bit fixed sub-codebook noticeably improve the performance, compared to the conventional channel correlation information quantization technique considered in the IEEE 802.16m standardization. It can also be seen that as the maximum variation in the channel correlation information decreases, the proposed quantization technique provides performance closer to the ideal performance. The proposed quantization technique that adaptively employs a 2-, 3-, or 4-bit sub-codebook depending on the maximum variation provides performance closer to the ideal performance.

Figure 8:
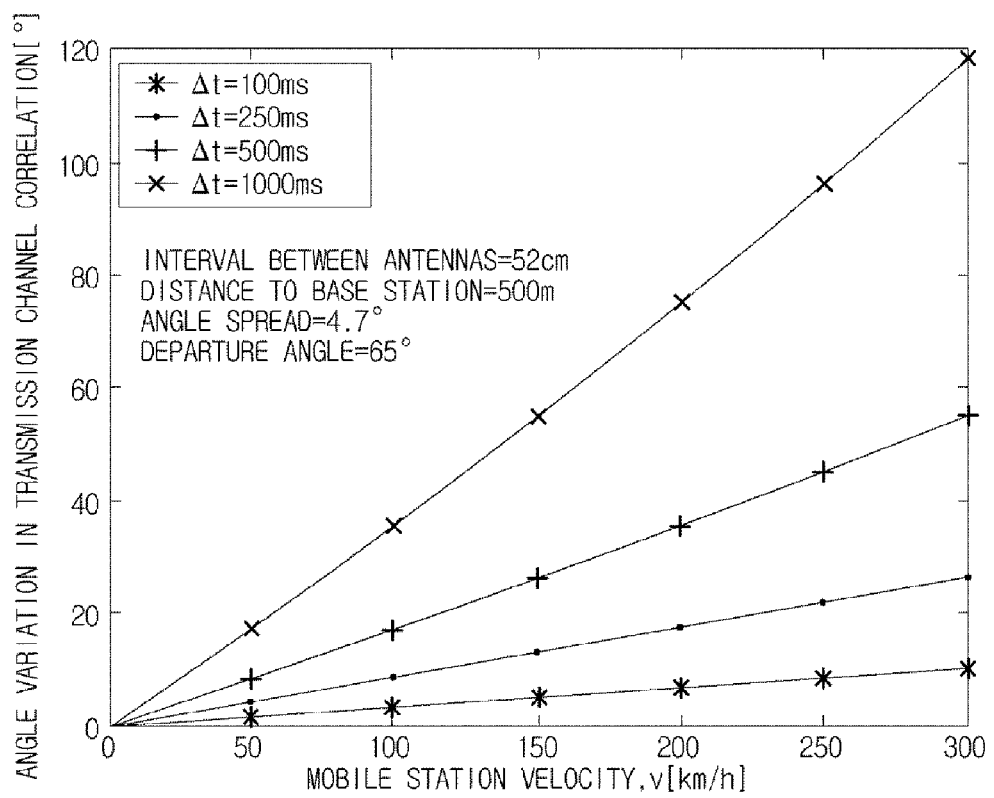
FIG. 8 is a graph showing the phase variation in the channel correlation coefficient depending on the user velocity and feedback period when the method of quantizing the CSI according to the present invention is applied.

FIG. 8 illustrates the maximum variation in the phase of the channel correlation coefficient according to the velocity of a mobile station and the CSI reporting period. It can be seen that as the velocity of the mobile station is higher, and as the CSI reporting period is longer, the maximum variation in the phase of the channel correlation coefficient is greatly changed. Therefore, depending on the velocity of the mobile station and the length of the feedback period, the sub-codebook that can be adjusted depending on the maximum variation in the phase of the channel correlation coefficient is adaptively adjusted, so that the performance of the proposed technique for differentially quantizing channel correlation information can be further improved. For example, when the velocity of the mobile station is 100 km/h, and the feedback period is 1000 ms, the maximum variation in the phase of the channel correlation coefficient is about 40°=0.22π, so that it is preferable to use a sub-codebook having $\Delta\theta_{l,max}=0.25\pi$. When the velocity of the mobile station is 100 km/h, and the feedback period is 500 ms, the maximum variation in the phase of the channel correlation coefficient is about 20°=0.1π, so that it is preferable to use a sub-codebook having $\Delta\theta_{l,max}=0.125\pi$.

As described above, in accordance with a method of differentially quantizing CSI and a wireless system using the method according to the present invention, there can be provided a channel correlation information quantization method, which can reduce the amount of information to be reported to the base station through an uplink by reducing the number of quantization bits without reducing the system capacity, or can improve system performance by using the same number of quantization bits, in a wireless communication system that employs multi-antenna technology.

In particular, the channel correlation information is differentially quantized and is reported in consideration of only partial range in which channel correlation information can vary relatively slowly, thus reducing the burden of the amount of signal information to be reported to the base station through an uplink.

Although the above description is merely intended to illustratively explain the technical spirit of the present invention, those skilled in the art can implement various changes and modifications, without departing from the essential features of the invention. Therefore, the embodiments described in the present invention are not intended to limit the technical spirit of the present invention and are intended to describe the present invention, and the technical spirit of the invention is not limited to the embodiments. The scope of the present invention should be defined by the accompanying claims, and all technical features falling within the range of the claims and equivalents thereof should be interpreted as being included in the scope of the present invention.

The invention claimed is:
1. A method of signal transmission based on differentially quantized channel information in a multi-antenna wireless communication system which can transmit signal to multiple mobile stations simultaneously through multiple transmit antennas, comprising:
   a main codebook reporting step of each mobile station for quantizing channel correlation information (CCI) using a main-codebook and reporting an index of the main codebook, which corresponds to the quantized CCI, to a base station;
   a sub-codebook reporting step of each mobile station reducing an amount of information used to report Channel State Information (CSI) to the base station through an uplink by i) quantizing the change of the CCI between the quantization interval using a sub-codebook and ii) reporting an index of the sub-codebook, which corresponds to the quantized CCI change, to the base station; and
   a multi-user eigen-beam transmission step of the base station for generating multiple eigen-beams using the index of the main-codebook or sub-codebook reported from mobile stations, and transmitting them, using the multiple transmit antennas of the base station, to multiple users simultaneously,
   wherein the sub-codebook reporting step is configured such that the sub-codebook is generated in consideration of the maximum change in the CCI, being calculated by the following Equation 10:

$$\Delta\rho_{l,max} = \rho_{l,max}(t) - \rho_l(t-\Delta t) \quad \text{[Equation 10]}$$

where $\Delta t$ denotes the CSI reporting (or quantization) interval, $\Delta\tau_{l,max}$ denotes a range in which the CCI of mobile station l can maximally vary during the CSI reporting (or quantization) period $\Delta t$, $\rho_l(t-\Delta t)$ denotes the channel correlation coefficient of mobile station l at the previous quantization time $t-\Delta t$, and $\rho_{l,max}(t)$ is calculated by the following Equation 9:

$$\rho_{l,max}(t) = J_0(2\pi d/\lambda) + 2\sum_{i=1}^{\infty} J_{2i}(2\pi d/\lambda)\cos(2i(AoD_k(t - \Delta t) + \Delta_{AoD_l}))\text{sinc}(2iAS) + j\left(2\sum_{i=0}^{\infty} J_{2i+1}(2\pi d/\lambda)\sin((2i+1)(AoD_k(t-\Delta t) + \Delta_{AoD_l}))\text{sinc}((2i+1)AS)\right) \quad \text{[Equation 9]}$$

where $\lambda$ denotes the wavelength of the signal, d denotes the distance between the two adjacent antennas of the base station, D denotes the distance between the mobile station and the base station, AS denotes the angle spread, $J_z(x)$ denotes the z-th order Bessel function of the first kind, and $AoD_l$ and $\Delta_{AoD_l}(=v_l\Delta t/D)$ denote the departure angle and the variation in the departure angle of mobile station l, respectively.

2. The method of claim 1, further comprising the step of sharing the same pre-defined main- and sub-codebook by the base station and mobile stations, where the main-codebook is for the representation of the entire range of CCI and the sub-codebook is for the representation of the change of CCI;
   wherein the sub-codebook reporting step is configured to compare the CCI quantized at the previous quantization time with currently obtained CCI, thus calculating the change in the CCI between the two quantization instants.

3. The method of claim 1, wherein the sub-codebook is generated in a fixed bit-size format in which the bit size is determined according to the maximum change in the CCI to provide required quantization precision at a uniform level, or in an adaptive bit format in which the bit size of the sub-codebook is adjusted according to the variation of the maximum change in the CCI to provide required quantization precision at a uniform level.

4. The method of claim 1, wherein, after the main codebook reporting step, the sub-codebook reporting step is repeatedly performed.

5. The method of claim 4, wherein the main codebook reporting step is performed either at a regular period determined according to the channel condition or at the presence of erroneous transmission of CSI.

6. A multi-antenna wireless system using a method of differentially quantizing Channel State Information (CSI), comprising mobile stations each of which comprising:
   a channel correlation information estimator for estimating channel correlation information;
   a channel correlation information quantizer for quantizing the entire range of the channel correlation information using a main-codebook and generating an index of the corresponding representative value in the main-codebook;
   a channel correlation information change calculator for calculating change in the channel correlation information; and
   a channel correlation information change quantizer for quantizing the change of the channel correlation information between the two consecutive quantization (or CSI reporting) intervals using a sub-codebook and generating an index of the corresponding representative value in the sub-codebook,
   wherein the mobile station reports either the index of the main- or sub-codebook to the base station with the use of an error correction code, including a Cyclic Redundancy Check (CRC) code,
   wherein the mobile station reduces an amount of information used to report the CSI by reporting the index of the sub-codebook to the base station.

7. The multi-antenna wireless system of claim 6, further comprising a base station comprising:
   a channel correlation information calculator for calculating the channel correlation information based on the index of the sub-codebook reported from the mobile station; and
   a multi-user eigen-beamformer for generating multiple eigen-beams based on the calculated channel correlation information.

8. The multi-antenna wireless system of claim 6, wherein the mobile stations and the base station respectively comprise channel correlation information storage units for storing quantized channel correlation information.

9. The multi-antenna wireless system of claim 8, wherein:
   the base station further comprises:
   an uplink signal quality measuring unit for measuring the uplink channel quality using signal received through the uplink; and
   a uplink transmission error detection unit for detecting the presence of transmission errors by checking error correction bits of the reported CSI, and
   the mobile station further comprises:
   a main codebook reporting period decider for deciding the CSI reporting period using the main-codebook based on the reported uplink quality measured by the uplink signal quality measuring unit of the base station or based on the occurrence of transmission errors detected by the uplink transmission error detection unit of the base station.

10. The method of claim 2, wherein, after the main codebook reporting step, the sub-codebook reporting step is repeatedly performed.

11. The method of claim 1, wherein, after the main codebook reporting step, the sub-codebook reporting step is repeatedly performed.

12. The method of claim 3, wherein, after the main codebook reporting step, the sub-codebook reporting step is repeatedly performed.

13. The multi-antenna wireless system of claim 7, wherein the mobile stations and the base station respectively comprise channel correlation information storage units for storing quantized channel correlation information.

\* \* \* \* \*